July 28, 1942.  L. L. CUNNINGHAM  2,290,944
CONTROL DEVICE
Filed Sept. 6, 1938
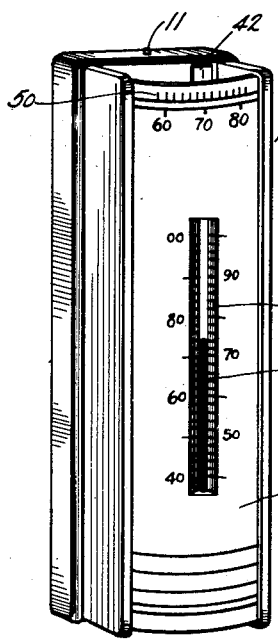
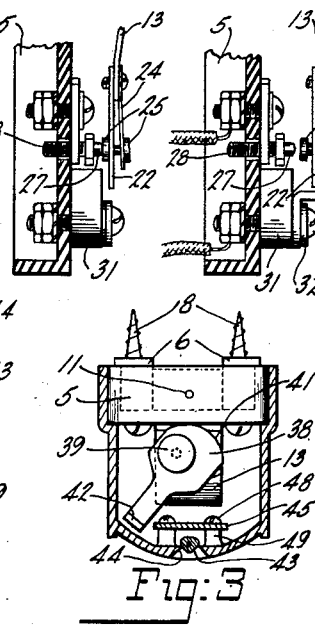
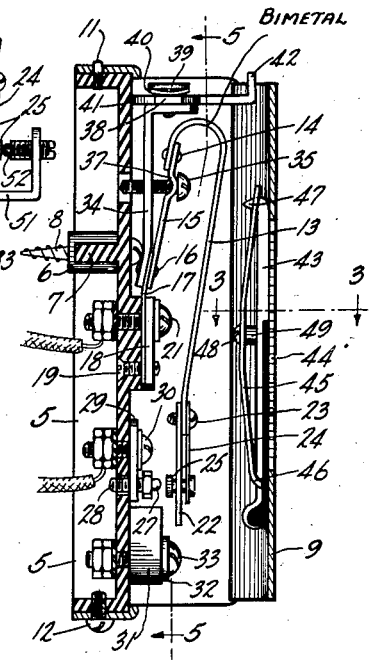
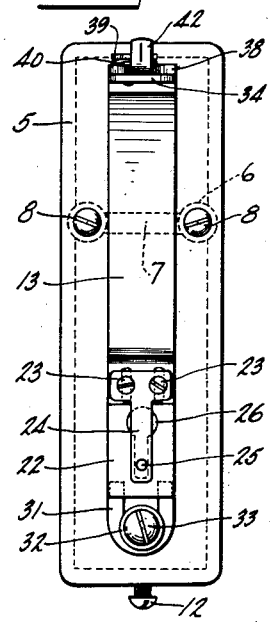
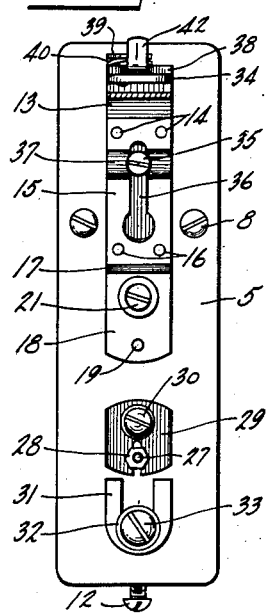
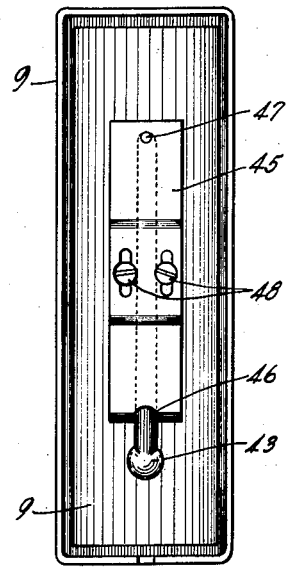
INVENTOR.
Lewis L. Cunningham
BY
ATTORNEY.

Patented July 28, 1942

2,290,944

UNITED STATES PATENT OFFICE 2,290,944

CONTROL DEVICE

Lewis L. Cunningham, Milwaukee, Wis., assignor to Perfex Corporation, Milwaukee, Wis., a corporation of Wisconsin Application September 6, 1938, Serial No. 228,562

22 Claims. (Cl. 200—139)

This invention relates in general to control devices but more particularly to control devices of the type responsive to physical conditions such as temperature and humidity, and the principal object of the invention is to provide a control device of simple construction and one which is extremely sensitive and reliable in operation.

A further object of the invention is to provide improved regulating and adjusting means for a control device whereby a more accurate and positive response of the device is attained at any physical condition value within prescribed limits.

Another object is to provide improved snap action switching means for a control device whereby more reliable switching operations are performed.

The invention in one of its forms has utility as a thermostatic switch which is arranged to be responsive to temperature variations in a space and to control heating equipment to maintain the space at a comfortable temperature. In this form of the invention the temperature responsive means comprises a bimetallic switching element and a novel feature is concerned with the means of adjusting and supporting the element upon a base together with means for indicating the adjustment.

A further object is to provide an improved thermometer support together with means on the cover whereby the thermometer may be easier to read and correlated with the scale markings on the cover.

Other objects and advantages not specifically enumerated reside in certain novel features of construction, arrangement, operation and combination of the parts of the control device which will be hereinafter more fully described and particularly pointed out in the appended claims and which taken together with the accompanying drawing discloses by way of example, a preferred embodiment of the invention in the form of a thermostatic switch such as a room thermostat. In the drawing:

Fig. 1 is a perspective view of the complete control device or thermostatic switch;

Fig. 2 is a side view with the base and cover in section;

Fig. 3 is a top view of the device with the cover taken in section along the line 3—3 of Fig. 2;

Fig. 4 is a full elevation view with the cover removed;

Fig. 5 is an elevation view along the line 5—5 of Fig. 2 with part of the thermostatic element cut away;

Fig. 6 is an inside view of the cover;

Fig. 7 is a cross-section of the lower portion of the device showing the switch contacts in closed position, while Fig. 8 shows a modified form of the switching elements.

Referring particularly to the drawing the control device elements are preferably supported upon an elongated base 5 made of molded insulation material having a flanged reinforcing portion extending around its periphery. A pair of projecting mounting bosses 6 formed in the base 5 are connected together by a reinforcing bridge 7 and have holes therein through which mounting screws 8 extend, whereby the device may be securely fastened upon a supporting wall or other surface. The flanged portion extending around the base is sufficiently wide so as to provide a space between the wall surface and the rear of the base in order that connecting wires may be protected and conveniently attached to securing means on the various terminal screws extending from the rear of the base as will be pointed out. A metal enclosing cover 9 preferably open at the top and bottom ends to permit air circulation through the device, is provided to protect the various elements mounted upon the base. The cover 9 is secured at the top to the base 5 by a small pin 11 anchored in the base which engages a hole in the cover, while at the bottom end a screw 12 threads into the base and engages a slotted opening in the cover to lock the cover to the base.

The means in the control device which responds to a physical condition is here shown in the form of a thermostatic element 13 comprising a flat piece of material constructed of two strips of metal having different coefficients of expansion and contraction when subjected to temperature variations. The bimetal element 13 is arranged with the expanding metal on the inside and has its upper end formed with a return U-bend as shown. It is conceivable that the expanding element may be placed on the outside so that the element will be responsive to temperature variations in a reverse manner, such as for example when the control is utilized in refrigeration systems. The return bent portion or relatively fixed end of the element 13 is fastened as by rivets 14 to one end of a flat calibrating arm 15. The other end of calibrating arm 15 is fastened by rivets 16 to a flat steel spring hinge 17. Steel hinge 17 is arranged with a portion of its length extending parallel with the base and rests upon a protruding portion thereof. A clamping plate 18 is placed on top of the hinge 17 and a clamping screw 19 extending from the rear of the base into threaded engagement with plate 18, clamps the hinge rigidly to the base. A terminal screw 21, having nuts threaded onto it at the rear of the base for the attachment of a connecting wire, also passes through the plate 18 and hinge 17 and assists in clamping the hinge in place.

The free or movable end of the bimetallic element 13 carries an iron armature plate 22. This armature is secured to the element by a pair of clamping screws 23 extending through slotted openings in the bimetal end and into threaded engagement with the armature 22 as seen in Fig. 4. A flexible blade 24 preferably made of phosphor bronze material and formed into a T shape is also fastened to the bimetal element end by the screws 23. This blade is arranged in position directly on top of and in spaced parallel relationship with the armature.

The means whereby the control device effects its control of the temperature changing medium is here shown in the form of control elements such as electrical switching contact means actuated by the movement of the thermostatic element 13. This switching means comprises as one part a movable contact button 25 suitably secured as by riveting to the free end of the flexible contact blade 24. A slotted aperture 26 in the armature 22 enables the narrow shank of contact 25 to extend through to the other side of the armature where the enlarged contact portion of the contact is arranged. One end of the slot 26 is enlarged to permit the large contact 25 to pass through the armature in the assembly of the elements. Arranged also upon the base is the fixed control element of the device shown here in the form of a contact button 27. Contact 27 is supported on the end of a contact stud 28 and is arranged in operable relation to the movable contact 25. The slots in the bimetal 13 through which screws 23 extend permit the armature 22 and flexible blade 24 to be shifted laterally and thereby properly align the movable contact 25 with the fixed contact 27 in the assembly of the control. The stud 28 is provided with a hexagonal headed portion adjacent the contact point 27 to enable it to be adjustably threaded into the split portion of a contact plate 29. The split plate 29 which tightly grips the stud threads to maintain the stud in its adjusted position is itself fastened directly to the top of the base 5 by means of a terminal screw 30 extending through the base. Thermal screw 30 is provided with clamping nuts on the rear side of the base which also serve for the attachment of a connecting wire.

The means for providing snap action to the switching elements includes a permanent magnet 31 supported upon the base 5 by means of a washer 32 and a clamping screw 33. This screw 33 extends through the base to the rear side thereof where it is provided with a pair of clamping nuts. The magnet 31 is arranged with its pole ends positioned directly below the iron armature 22 so that it can magnetically influence the armature when it is moved in the direction of its poles.

In order to enable the bimetallic element 13 to be rendered responsive to actuate the switching means at any desired temperature value, an adjustment therefor is provided which comprises a stiff adjusting member or bracket 34 fastened rigidly to the end of the spring hinge 17 together with the calibrating arm 15 by means of the rivets 16. A calibration adjusting screw 35 extends through a slotted opening 36 (see Fig. 5) of arm 15 and into threaded engagement with the bracket 34 for a purpose which will be hereinafter pointed out. At the point of engagement of calibrating screw 35 with the arm 15 a raised curved portion 37 is formed on the arm so that the screw 35 will always have a bearing surface for its head which is substantially parallel with the surface of the bracket 34 into which it threads. The calibrating arm 15 and the adjusting bracket 34 diverge from their connecting ends at the spring hinge 17 and the arm 15 is made somewhat flexible and provided with sufficient tension against the head of calibrating screw 35 to tend to urge the elements apart at their other ends. Turning of the screw 35 therefore is adapted to flex the arm 15 and vary the angular displacement between the arm and bracket 34. The steel spring hinge 17 is also provided with sufficient tension so as to normally bias or urge the adjusting bracket member 34 at all times in a direction toward and against the base 5.

At the top end of the control device a manual adjusting means is provided which comprises an adjusting arm 38 eccentrically pivoted by a pin 39 to a transversely extending leg formed at the upper end of adjusting bracket member 34. The arm 38 is rotatably adjustable in a direction perpendicular to the base. The pivot pin 39 is riveted to the member 34 and in order to provide relatively tight bearing surfaces between the arm 38 and bracket 34 a spring washer 40 is placed under the head of pivot pin 39 to resiliently urge the bearing surfaces together and still permit relative manual rotation of the adjusting arm about its pivot. This arrangement holds the arm 38 in its adjusted set position and prevents accidental displacement thereof. The pivot pin 39 it will be noted (see Fig. 3) is not placed in the center of the arm 38 and member 34, but is arranged slightly to the left and eccentric thereto for a purpose which will be hereinafter apparent. At the rear edge of adjusting arm 38 a cam surface 41 is formed which is always maintained in intimate slidable contact with the hard surface of the base 5 by the biasing tension exerted by the spring hinge 17 upon the adjusting bracket 34. The front end of the adjusting arm 38 is provided with an upwardly extending portion 42 which is positioned so as to closely approach the inside surface of the upper end of the cover 9 and to slightly project beyond the top of the cover opening as seen in Fig. 1. This projection 42 is adapted to be grasped to manually rotate the adjusting arm 38 in an arc approximating the curvature of the cover front and by its adjusted position serves as a visual indicator of the adjustment since its projects beyond the top edge of the cover.

The rounded off front of the cover 9 is provided with the usual thermometer 43 which is arranged behind an elongated slot in the cover so as to be visible from the outside. Each side of the slot adjacent the thermometer is graduated into temperature scale readings 44 to indicate room temperature for example. The thermometer 43 is resiliently held against the cover opening so as to project slightly therethrough, by a guard plate 45 which has a forked end 46 at the bottom end engaging the lower end of the thermometer and an aperture 47 at the upper end in which the top curved end of the thermometer is sealed or cemented. The guard plate 45 is adjustably fastened to the rear of the cover by a pair of screws 48 which extend through elongated slots (see Fig. 6) in the guard plate into the bosses 49 in the cover whereby the guard plate together with the thermometer can be shifted longitudinally when the screws 48 are loosened. This arrangement makes it possible to readily calibrate the thermometer with the scale readings 44 on the front of the cover by merely loosening the screws 48 and shifting the guard plate either up or down. At the top edge of the cover 9 a temperature scale 50 is marked which cooperates with the pointer 42 to indicate the temperature at which the instrument is set for operation.

The temperature scale 44 is stamped on each side of the elongated slot or opening through which the thermometer 43 projects and the portion of the cover adjacent the slot is made somewhat thicker as shown. The flat sides of this slot are shaped so as to diverge from the front rounded surface of the cover at a fairly broad angle inward toward the sides of the thermometer as clearly seen in Fig. 3. Since the thermometer projects slightly through the slot in the curved front of the cover and the scale markings are stamped on an angular surface it will be apparent that the scale markings will be more readily readable from any angle at which they may be viewed from the front of the device and the position of the mercury in the thermometer may be more readily perceived and correlated with the scale markings to determine the correct temperature reading. This greater angle of visibility obviates the necessity of peering closely at the instrument from directly in front of it to observe the temperature reading as was usually the case in devices of this nature in which the sides of the thermometer slot were arranged abrupt and at right angles to the cover or were slightly rounded off with the scale markings stamped on the cover surface.

The calibration of the control device when initially assembled, is accomplished by placing the instrument in a room for an interval where the known temperature is maintained constantly at a reading of 70 degrees Fahrenheit, for example. The pointer 42 is then manually rotated until it is positioned opposite the numeral 70 on the scale 50. The cover is then removed and calibrating screw 35 is adjusted with an angular screwdriver until the bimetal 13 is moved to just close the contacts 25 and 27. The instrument is now set to actuate the contacts at any temperature value to which the bimetal may be subjected if the pointer 42 is moved to that particular indication on scale 50. In other words the action of the bimetal is now coordinated with the graduations on the scale 44.

The differential of an instrument of this type is the change in temperature necessary to cause the bimetal element 13 to open and close the contacts. This differential may be calibrated with the contacts closed by applying a wrench to the contact stud 28 and adjusting it to give a small clearance or gap between the armature 22 and magnet 31. By varying this gap the desired differential of one or more temperature degrees may be brought about. To increase or widen the differential setting the stud 28 is turned clockwise into the plate 29 thereby decreasing the gap and rendering the pull of the magnet upon the armature stronger. By varying this gap the desired differential of one or more degrees of temperature may be effected.

In explaining the operation of the control device, assume for example that it is arranged to control a heating plant so as to maintain the room in which the device is located at a comfortable temperature. As the ambient temperature falls to the cut-in point for which the thermostat is set, the movable end of the bimetal element 13 gradually moves the armature 22 closer into the influence of the magnet 31 where the intensity of the magnetic field emanating from the magnet is correspondingly greater. The bimetal deflects under the attractive force of the magnet until sufficient force is obtained to oppose the attraction and restore equilibrium. This continues as the temperature falls until a point is reached where the magnetic effort is greater than the opposing spring effort of the bimetal, and the armature snaps over toward the magnet. The contacts close with a snap action shortly before the armature completes its full movement because the flexible contact blade 24 carries the contact 25 slightly ahead of the armature 22 and the armature comes to rest by engaging the top side of the movable contact 25 as seen in Fig. 7. Due to the resiliency of the flexible blade 24 carrying the movable contact 25, a slight wiping action takes place as the contacts engage so that they are always maintained bright and clean. With the contacts in engagement the flexible blade 24 is slightly flexed or bowed away from its parallel position with the bimetal element 13 and armature 22, because the rear side of the contact 25 is now in abutting engagement with the under side of the armature 22. The short movement of the armature 22 until it strikes the rear of contact 25 enables a relatively sharp blow to be struck the contact when it engages the fixed contact 27 thereby establishing good contact with the contacts closed. The armature 22 is also prevented from coming into engagement with the magnet while at the same time the pull of the magnet holds the contacts with considerable pressure into close association with one another so that they cannot be accidently jarred open should the device be mounted in a location that is subject to shocks or vibrations of any kind.

As a result of the closing of the contacts the heating plant is caused to generate more heat and the room temperature is thereby gradually raised. The bimetal element 13 responds to this condition to effect an opening of the contacts when the rise in temperature corresponds to the differential of the instrument. As the free end of the element tends to move away from the base 5 effort is stored in the resilient element 13 until a balance of forces is reached between the element and the magnet. Shortly after the balance is reached the armature is rapidly moved away by the element because the tension of the element is now stronger than the pull of the magnet, and the contacts are opened with a snap action. However, due to the flexibility of the blade 24 the movable contact 25 remains in engagement with the fixed contact 27 for a short interval after the aforesaid balance of force has been passed. The foregoing operations of separating the contacts with snap action precludes the possibility of the formation of destructive arcs between the contacts, prevents hesitancy or chattering of the contacts as the bimetal responds to temperature variations, and also effects a slight wiping action to assist in maintaining the contacts clean. Should the contacts tend to stick or slightly weld due to the passage of current between them they are immediately pried and forced apart by the armature striking the underside of the flexible blade 24 with a slight blow. The fact that the contacts are actuated with snap action enables the control device to be mounted in any off normal position different from that illustrated without effecting the accurate and reliable operation of the device.

The opening of the contacts effects a control of the heating plant whereby an abatement of the heat generated by the same is brought about. The control circuit when the contacts are closed extends over a circuit path through connecting wires between the burner of the heating device, a source of current, and the control device. At the control device it passes over a path from the connecting wire attached to terminal screw 30, contact plate 29, fixed contact stud 28, fixed contact 27, movable contact 25, both the armature 22 and the flexible blade 24, bimetal element 13, connecting arm 15, spring hinge 17 clamping plate 18, terminal screw 21, and out to the connecting wire attached thereto.

It will be apparent that movement of the pointer 42 along the scale 50 will change the control point of the instrument. Thus movement of this pointer to the right as seen in Fig. 1 will cause the cam surface 41 to move the bracket 34 away from the base, thereby causing the movable contact 25 to approach the fixed contact 27. This movement of pointer 42 thus raises the temperature setting of the instrument. It will be noted that the pivot 39 for the lever 38 is arranged off center with respect to the bracket member 34. This arrangement causes the portion of the cam surface 41 which engages the base to be substantially central with respect to the base and bracket member.

It is desirable under certain conditions that the device control more than a single circuit and that the bimetal element 13 effect a separate contact closure in each of its directions of movement. This arrangement may easily be applied to the instant invention by the simple modification shown in Fig. 8. It consists in the addition of a non-magnetic metal bracket 51 bent into the Z-shape illustrated and secured by the washer 32 and screw 33 directly on top of the magnet 31. The screw 33 also serves for the attachment of the additional connecting wire on the rear side of the base. The other end of the bracket 51 supports an adjustable contact stud carrying a contact point 52 on its end. The double ended contact 25 is thereby arranged to be moved into contact with either contact 27 or contact 52. In its outward movement from the base, the bimetal element 13 carries the flexible blade 24 along with it until the contact 25 engages contact 52 after which blade 24 will flex until it is engaged with a slight blow by the right hand surface of the armature 22 as shown. Before the outward movement of the bimetal blade is initiated considerable effort is built up in the bimetal to oppose the attraction of the magnet. When the blade snaps outward the magnetic effort falls much more rapidly than the spring effort of the bimetal decreases and a considerable unbalance in force is obtained which accelerates the armature in the direction desired and effects a snap action closure of the contacts 25 and 52. Conversely when the element moves toward the base the armature 22 moves away from the flexible blade 24 until it almost approaches the rear side of contact 25 at which time the tension of the element is overcome and the magnet takes full control to effect the snap acting closure of the contacts 25 and 27 and the opening of the contacts 25 and 52. The contacts 25 and 52 it is seen remain closed until the magnet has full control because of the flexure of blade 22 and these contacts are therefore closed and opened with a snap action in somewhat the same manner as the contacts 25 and 27. Should the contacts 25 and 52 have a tendency to stick or weld, the armature 22 would strike the rear of contact 25 a sharp blow and thereby force them to separate. The fact that contact 25 may be said to "float" between contacts 27 and 52 enables the armature to strike the rear side of the contact 25 in either direction of movement and thereby contribute considerably to the establishment of good electrical conductivity. The foregoing arrangement likewise renders it unnecessary to provide an additional magnet for the top side of the armature since the magnet 31 effects the snap action in both directions of movement of the bimetal element.

Although the invention has been illustrated and described in a simple and practical form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following appended claims.

What is claimed is:

1. In a control device of the class described, a supporting base, a condition responsive device including a physical condition responsive element, an adjusting bracket, means for securing the adjusting bracket to said condition responsive device, spring hinge means on the base connected to the adjusting bracket and condition responsive device, a movable control means actuated by the free end of the element, a fixed control means secured to the base in operative relation to the movable control means, and adjustable cam means on the adjusting bracket having slidable contact against a surface on the base and held in engagement therewith by the tension of the hinge spring, whereby the rotation of said cam means is effective to rotate said adjusting bracket and element about said hinge for predetermining the physical condition value at which the element actuates the control means.

2. In a control device of the class described, a supporting base, a spring hinge secured to the base, an adjusting bracket, a condition responsive device including a physical condition responsive element, means for attaching said condition responsive device and the adjusting bracket to the spring hinge, said spring hinge normally tending to urge said adjusting bracket toward the base, cam means mounted on the adjusting bracket and having slidable contact against a surface on the supporting base for regulating the separation between the bracket and the base, said condition responsive device being biased with respect to the adjusting bracket, means engaging the adjusting bracket and condition responsive device for adjustably varying the separation of the condition responsive device from the adjusting bracket for calibrating the condition responsive element with respect to the cam means, and cooperating control elements operated by the condition responsive element.

3. In a control device of the class described, a base, an adjusting bracket, spring hinge means for pivoting one end of the adjusting bracket to the base, said spring hinge normally tensioned to urge the other end of the bracket against the base, a manual adjusting arm rotatably supported upon said adjusting bracket, a cam surface on the adjusting arm bearing directly upon the base as a result of the tension of the spring hinge, said adjusting arm effective to slide its cam surface on the base and vary the position of the adjusting bracket about the spring hinge, a U-shaped bimetal element having one leg secured to the adjusting bracket, and switching mechanism operated by the free end of the bimetal element.

4. In a control device of the class described, a base, an adjusting bracket, hinge means for pivoting one end of the bracket to the base, a transverse portion on the other end of the bracket extending perpendicular to the base, a manual adjusting arm extending perpendicular to the base, means for pivoting the adjusting arm to the bracket portion and for maintaining the arm in its adjusted position, a cam surface on the adjusting arm arranged in slidable relation with a surface on the base whereby the rotation of the adjusting arm moves the bracket about the hinge means and varies its position with respect to the base, a calibrating arm secured at one end with the bracket to the hinge means, physical condition responsive means secured to the other end of the calibrating arm, switching means controlled by the condition responsive means, said condition responsive means being adjusted by the bracket, to actuate the switching means in accordance with different values of the physical condition, means on said adjusting arm for indicating the adjusted position of the condition responsive means and a calibrating adjustment between the bracket and the calibrating arm for initially calibrating the position of the adjusting arm and the condition responsive means.

5. A control device of the class described, comprising a base, a bimetallic element, hinge means for movably mounting one end of the element to the base, manual adjustment means connected to the element, a cam on the adjustment means slidably engaging a surface on the base for moving said one end of the element to variably position the other end of the element with respect to the base, an armature supported on the movable end of the element and having an aperture therein, a flexible blade arranged parallel to the armature and also supported on the movable end of the element, a movable contact fastened to the free end of the flexible blade and extending through the armature aperture, a fixed contact mounted upon the base in operative relation to the movable contact, and a magnet mounted on the base in operative relation to the armature; said bimetallic element, flexible blade and magnet all cooperating to control the operation of the contacts with snap action.

6. A control device of the class described, comprising a supporting base, a bimetallic element, means including hinge means for adjustably securing said element to the base, adjusting means for adjusting said element about said hinge means, an armature carried at one end of the element and having an aperture therein, a flexible blade arranged parallel to the armature and also carried by the element, a movable contact carried by the end of the flexible blade and extending through the armature aperture, said movable contact arranged to float in said armature aperture and having a contact surface positioned on each side of the armature, a fixed contact supported on the base in operative relation to one surface of the movable contact, a second fixed contact supported on the base in operative relation to the other surface of the movable contact, said bimetallic element being effective to move said movable contact surfaces into engagement with either one of the associated fixed contacts, said flexible blade being flexed upon engagement of the contacts whereby the armature strikes the rear of the movable contact surfaces, a magnet supported on the base in operative relation to the armature, said bimetallic element and said flexible blade cooperating with said magnet and armature to provide snap action between the movable contact and either of the fixed contacts.

7. A control device of the class described, comprising a base, a resilient bimetallic element, hinge means secured to the base, a resilient calibrating arm connected with the hinge means for adjusting the element, adjustment means associated with the calibrating arm for variably positioning the element about the hinge means with respect to the base, means on the calibrating arm for coordinating the operation of the bimetallic element with the adjustment means, an armature supported on the other end of the element and having an aperture therein, a flexible blade supported at one end from the element and extending in parallel spaced relationship with the armature, a movable contact carried by the free end of the flexible blade and extending through the aperture in the armature to the other side thereof, a fixed contact supported upon the base in cooperative relationship with the movable contact, said flexible blade permitting the armature to engage the rear of the movable contact after the contacts engage, a magnet supported on the base with its poles arranged below the armature, the engagement of said contacts acting as a stop to prevent actual engagement of the armature with the magnet, means for adjusting the height of the fixed contact to vary the gap between the armature and magnet to thereby alter the differential of the control device, the resiliency of said flexible blade, and said bimetal element assisting the magnetic influence of the magnet upon the armature in actuating the contacts with snap action.

8. In a control device comprising switching mechanism supported upon a base, a cover therefor having a curved front and an elongated slotted opening therein, the portion of said cover front on each side of the opening being thicker than the remaining curved portion and being formed with angular flat surfaces diverging from the front cover surface inward to the edges of the opening, temperature scale marking stamped on the angular flat surfaces on each side of the cover slot, a thermometer arranged on the rear of the cover opening and projecting slightly therethrough, the angular sides of the slot and the curved portion of the cover front enabling the reading of the thermometer to be correlated with the scale markings more readily when viewed within a wide angle from the front of the device, and means for adjustably supporting the thermometer upon the thickened portion of the cover on each side of the slot whereby the thermometer and scale markings are calibrated, said means comprising an elongated resilient member supported intermediate its ends and having the ends resiliently engaging the thermometer for supporting the same.

9. A device of the class described comprising, a base, physical condition responsive means supported on the base, control means operated by the physical condition responsive means, and rotatable adjusting means for the physical condition responsive means to select the physical condition at which the control means operates, said adjusting means arranged to shift its axis of rotation relative to the base when adjusted.

10. A base, physical condition responsive means supported on the base, control means operated by the physical condition responsive means, and adjusting means connected to the physical condition responsive means and having a cam surface slidably engaging a surface which is stationary relative to the base for moving the physical condition responsive means to select the physical condition at which the control means operates, said adjusting means arranged to move toward or away from said surface when adjusted.

11. A base, physical condition responsive means supported on the base, control means operated by the physical condition responsive means, an adjusting bracket connected to the physical condition responsive means, a cam pivoted to the adjusting bracket and slidably engaging a surface which is stationary relative to the base for moving the adjusting bracket and the physical condition responsive means fastened thereto to select the physical condition at which the control means operates, said adjusting bracket and pivot for the cam arranged to move toward or away from said surface when said cam is adjusted.

12. A device of the class described, a base, physical condition responsive means supported upon the base, control means operated by the physical condition responsive means, rotatable adjusting means for selecting the physical condition at which the control means is operated, said adjusting means comprising a rotatable lever pivotally connected to the physical condition responsive means at a point intermediate the ends of the lever and having its axis of rotation arranged parallel to the base, said lever having one end projecting forwardly of the base and the other end provided with a cam surface cooperating with the base whereby rotation of the lever shifts the axis of the lever relative to the base, a cover on the base enclosing the physical condition responsive means and having an open top and bottom to permit passage of air therethrough, said cover having a portion of its front surface substantially coinciding with the path of movement of the projecting end of the lever, and cooperating indicia on the projecting lever and the cover for indicating the lever adjustment.

13. A temperature indicating device for a thermostatic control device having a cover formed with a slot, the combination of, a pair of bosses formed on the back of said cover at a point intermediate the ends of said slot, one boss being located on one side of said slot and the other boss being on the other side thereof, a thermometer element mounted on the back of said cover so as to be visible through said slot, said thermometer element extending beyond the ends of said slot and engaging the rear face of said cover, a guard plate for said thermometer element, said guard plate being formed of a resilient strip tending to present a partially concave surface to said thermometer element and extending beyond the ends of the slot whereby the ends of the guard plate yieldably engage the thermometer element adjacent the ends thereof for pressing the thermometer element into engagement with the cover when the guard plate is in place, said guard plate having slots therein opposite said bosses, and screws in said slots for adjustably securing the guard plate to said bosses.

14. A temperature indicating device for a thermostatic control device having a cover formed with a slot, the combination of, a boss formed on the back of said cover at a point substantially spaced from the ends of said slot, said boss being located to one side of said slot, a thermometer element mounted on the back of said cover so as to be visible through said slot, said thermometer element extending beyond the ends of said slot and engaging the rear face of the cover, securing means for said thermometer element, said securing means comprising a spring member tending to engage the thermometer element only adjacent the ends thereof and extending beyond the ends of the slot, whereby the ends of the spring member yieldably engage the thermometer element adjacent its ends for pressing said thermometer element into engagement with the cover, and means for securing said spring member to said boss.

15. An instrument of the character described comprising a base, a control means mounted on said base, said control means comprising a physical condition responsive element and a control device arranged for actuation by said element, adjusting means for adjusting said control means, said adjusting means comprising a cam having a surface slidably engaging a surface which is stationary relative to the base, said adjusting means when actuated serving to shift a portion of the control means relatively to said base.

16. An instrument of the character described comprising a base, a control means mounted on said base, said control means comprising a physical condition responsive element and a control device arranged for actuation by said element, adjusting means for adjusting said control means, said adjusting means comprising a rotatable cam having a cam surface slidably engaging a surface which is stationary relative to the base, the axis of said rotatable cam shifting toward or away from said stationary surface upon rotation of the cam.

17. A control instrument of the character described, the combination of, a control means comprising a physical condition responsive element and a control device arranged for actuation by said element, adjusting means for adjusting said control means, said adjusting means comprising a lever having a handle portion adapted for manual operation, said handle portion traversing a generally arcuate path through its range of movement, means actuated upon rotation of said lever for bodily shifting a portion of the control means for thereby adjusting the same, an elongated casing for covering said control instrument and having its major axis extending in a direction parallel with the axis of said lever, said casing having a rear wall adapted for mounting the instrument and having a curved front wall portion adjacent said handle portion, said curved wall portion being substantially concentric with the arcuate path of said handle portion, and indicia on said wall portion for indicating the adjustment of the instrument.

18. A control instrument of the character described, the combination of, a control means comprising a physical condition responsive element and a control device arranged for actuation by said element, adjusting means for adjusting said control means, said adjusting means comprising a lever pivoted intermediate its ends, one end of said lever being formed to provide a cam surface, means cooperating with said cam surface for bodily shifting a portion of said control means upon rotation of said lever, the other end of said lever being formed to provide a handle portion, said handle portion traversing a generally arcuate path through its range of movement, a casing for covering said control instrument, said casing having a curved wall portion adjacent said handle portion, said curved wall portion being substantially concentric with the arcuate path of said handle portion, and cooperating indicia on said wall portion and lever for indicating the adjustment of the instrument.

19. A control instrument of the class described, the combination of a housing comprising a wall plate and a cover, the wall plate being adapted for mounting upon the wall of a room and arranged to support the cover, a U-shaped bimetal element arranged within the housing, electrical switching mechanism arranged within the housing for actuation by said bimetal element, hinge supporting means for said bimetal element, cam means for causing rotation of said U-shaped element about said hinge supporting means to thereby adjust the control point of the instrument, an adjusting lever for actuating said cam means, said lever extending generally outwardly from said wall plate and having a handle portion traversing a generally arcuate path through its range of movement, said cover having a curved wall portion spaced from said wall plate and adjacent said handle portion, said curved wall portion being substantially concentric with the arcuate path of said handle portion, and cooperating indicia on said wall portion and lever for indicating the adjustment of the instrument.

20. A temperature indicating device for a thermostatic control device having a cover formed with a slot, the combination of, a boss formed on the back of said cover at a point substantially spaced from the ends of said slot, said boss being located to one side of said slot, a thermometer element mounted on the back of said cover so as to be visible through said slot, said thermometer element extending beyond the ends of said slot and engaging the rear face of the cover, securing means for said thermometer element, said securing means comprising an elongated spring member secured to said boss, said spring member having a pair of thermometer element engaging portions spaced longitudinally of said thermometer element and yieldably engaging the thermometer element near the ends of the slot for yieldably pressing the thermometer element into engagement with the rear face of the cover.

21. In a control device, the combination of, a base, a condition responsive element, an adjusting arm, means for adjustably securing the condition responsive element and adjusting arm to the base so that movement of the adjusting arm relative to the base causes corresponding movement of the condition responsive element, a pivot carried by said adjusting arm, a cam carried by said pivot, said cam having a cam surface facing the base and adapted to shift said pivot and adjusting arm relative to the base upon rotation of the cam, and means for retaining the cam in adjusted position.

22. In a control device, the combination of, a base, a spring hinge secured to the base near the mid-portion thereof, an adjusting arm having one end secured to the spring hinge and extending generally parallel with the base toward one end thereof, the spring hinge biasing the adjusting arm toward the base, a condition responsive element carried by said spring hinge and extending toward the other end of the base, said condition responsive element being adjusted in position by movement of the adjusting arm about said spring hinge, said adjusting arm being formed at its other end with a transverse portion perpendicular with the base and with the major portion of said arm, a pivot carried by said transverse portion, a cam carried by said pivot, said cam having a cam surface facing the base and adapted to shift said pivot and adjusting arm relative to the base upon rotation of said cam, and means for retaining said cam in adjusted position.

LEWIS L. CUNNINGHAM.